United States Patent
Chang et al.

(10) Patent No.: US 10,941,803 B2
(45) Date of Patent: Mar. 9, 2021

(54) BLIND BOLT FASTENING DEVICE

(71) Applicants: China University of Mining and Technology, Jiangsu (CN); China Mining & Civil New Material Science and Technology Ltd., Jiangsu (CN)

(72) Inventors: Hongfei Chang, Jiangsu (CN); Jianbiao Bai, Jiangsu (CN); Yaping Lu, Jiangsu (CN); Junwu Xia, Jiangsu (CN); Fengjie Zhang, Jiangsu (CN); Wei Xie, Jiangsu (CN)

(73) Assignees: China University of Mining and Technology, Jiangsu (CN); China Mining & Civil New Material Science and Technology Ltd., Jiangsu (CN)

( * ) Notice: Subject to any disclaimer, the term of this patent is extended or adjusted under 35 U.S.C. 154(b) by 0 days.

(21) Appl. No.: 16/484,963

(22) PCT Filed: Sep. 30, 2018

(86) PCT No.: PCT/CN2018/108914
§ 371 (c)(1),
(2) Date: Aug. 9, 2019

(87) PCT Pub. No.: WO2019/119925
PCT Pub. Date: Jun. 27, 2019

(65) Prior Publication Data
US 2020/0003247 A1    Jan. 2, 2020

(30) Foreign Application Priority Data
Dec. 19, 2017   (CN) .......................... 201711379086.3

(51) Int. Cl.
*F16B 35/06*    (2006.01)
*F16B 37/00*    (2006.01)
(Continued)

(52) U.S. Cl.
CPC .............. *F16B 35/06* (2013.01); *F16B 37/00* (2013.01); *F16B 39/28* (2013.01);
(Continued)

(58) Field of Classification Search
CPC ....... F16B 39/28; F16B 39/06; F16B 19/1063
(Continued)

(56) References Cited

U.S. PATENT DOCUMENTS 567,115 A  *  9/1896  Atkinson ................. A47G 1/20
                                                                411/340
761,277 A  *  5/1904  Wilbur ................ F16B 19/1054
                                                                411/340
(Continued)

FOREIGN PATENT DOCUMENTS

CN          205001349 U       1/2016
CN          105370702 A       3/2016
(Continued)

OTHER PUBLICATIONS

International Search Report of PCT/CN2018/108914, dated Jan. 9, 2019.
(Continued)

*Primary Examiner* — Gary W Estremsky
(74) *Attorney, Agent, or Firm* — Collard & Roe, P.C.

(57) ABSTRACT

The present invention discloses a blind bolt fastening device, and belongs to the technical field of bolts. The blind bolt fastening device includes Z-shaped gaskets, a fixed plate, elastic hinges, a screw cap, a nut, an integrated gasket and the like. The top end of the screw cap is connected to the fixed plate in a spot welding manner. A plurality of elastic hinges is uniformly mounted on the fixed plate. One end of each elastic hinge is rotatably fixed on the fixed plate. Connection points of the elastic hinges and the fixed plate do not exceed the outer edge of the fixed plate. The other end
(Continued)

of each elastic hinge is connected to one Z-shaped gasket in a spot welding manner. In an initial state, the plurality of Z-shaped gaskets are uniformly distributed and fitted onto the outer wall of the screw cap along a circumferential direction. When needing to pass through amounting hole, the plurality of Z-shaped gaskets may be folded through the elastic hinges to the top end of the screw cap and form elastic potential energy for rebounding. The present invention realizes simple and quick single side installation of a bolt and may be widely applied to civil and architectural engineering, mechanical engineering and the like.

8 Claims, 3 Drawing Sheets

(51) Int. Cl.
   *F16B 39/28* (2006.01)
   *F16B 19/10* (2006.01)
   *F16B 41/00* (2006.01)
   *F16B 43/00* (2006.01)

(52) U.S. Cl.
   CPC ......... *F16B 19/1054* (2013.01); *F16B 41/002* (2013.01); *F16B 43/00* (2013.01)

(58) Field of Classification Search
   USPC .................. 411/362, 367, 340, 341, 345
   See application file for complete search history.

(56) References Cited

U.S. PATENT DOCUMENTS

| | | | | |
|---|---|---|---|---|
| 2,404,169 A | * | 7/1946 | Gidden | F16B 13/0808 |
| | | | | 411/340 |
| 4,245,652 A | * | 1/1981 | Kelly | A61D 13/00 |
| | | | | 600/549 |
| 4,850,773 A | * | 7/1989 | Asami | F16B 9/023 |
| | | | | 411/173 |
| 5,417,531 A | * | 5/1995 | Brown | E05F 5/06 |
| | | | | 29/525.01 |
| 5,464,311 A | * | 11/1995 | Hiraguri | F16B 13/0808 |
| | | | | 29/525.02 |
| 6,206,625 B1 | * | 3/2001 | Dessouroux | F16B 39/04 |
| | | | | 411/208 |
| 7,001,126 B2 | * | 2/2006 | Lesecq | F16B 19/1054 |
| | | | | 411/340 |
| 8,313,273 B2 | * | 11/2012 | Chu | A47G 1/20 |
| | | | | 411/340 |
| 2013/0142588 A1 | | 6/2013 | Slater et al. | |
| 2018/0298935 A1 | | 10/2018 | Fan et al. | |
| 2019/0015959 A1 | * | 1/2019 | Strange | B25B 29/02 |

FOREIGN PATENT DOCUMENTS

| | | |
|---|---|---|
| CN | 107882842 A | 4/2018 |
| CN | 207598686 U | 7/2018 |
| DE | 102008038879 A1 | 2/2010 |

OTHER PUBLICATIONS

Written Opinion of the International Searching Authority of PCT/CN2018/108914, dated Jan. 9, 2019.

* cited by examiner

BLIND BOLT FASTENING DEVICE

CROSS REFERENCE TO RELATED APPLICATIONS

This application is the National Stage of PCT/CN2018/108914 filed on Sep. 30, 2018, which claims priority under 35 U.S.C. § 119 of Chinese Application No. 201711379086.3 filed on Dec. 19, 2017, the disclosures of which are incorporated by reference. The international application under PCT article 21(2) was not published in English.

FIELD OF THE INVENTION

The present invention relates to a blind bolt, and belongs to the technical field of bolts.

DESCRIPTION OF RELATED ART

An existing bolt includes two parts: a screw and a nut. It is required to insert the screw on one side and then tighten the nut on the other side. A worker needs to work on both sides of a component at the same time, but an ordinary bolt cannot be installed on some special occasions, such as a closed-section component or a component, a certain side of which cannot be conveniently touched. For example, in terms of a beam-column connection in a concrete-filled steel tube structure, the ordinary bolt cannot be operated on both sides or installed as the section of a column is closed. An existing core-through bolt technology has an extremely high requirement for the reserving precision of bolt holes in both sides of a pipe wall, and is difficult for alignment and application to side column connections and corner column connections. The existing blind bolt needs a relatively complicated installation tool and relatively cumbersome installation steps. In view of the problems in the prior art, the present invention is directed to a novel blind bolt fastener which is easy to manufacture and convenient for construction.

SUMMARY OF THE INVENTION

Technical Problem

In order to overcome the shortcomings in the prior art, the present invention provides a blind bolt fastening device, which realizes single side fastening only by installing a bolt on one side.

Technical Solution

The present invention is implemented through the following technical solution: a blind bolt fastening device, including a screw cap and a screw. A mounting hole capable of allowing the screw cap to pass through is formed in a plate to be connected. The top end of the screw cap is connected to a fixed plate in a spot welding manner. A plurality of elastic hinges is uniformly mounted on the fixed plate. One end of each elastic hinge is rotatably fixed on the fixed plate. Connection points of the elastic hinges and the fixed plate do not exceed the outer edge of the fixed plate. The other end of each elastic hinge is connected to a Z-shaped gasket in a spot welding manner. In an initial state, the plurality of Z-shaped gaskets are uniformly distributed and fitted onto the outer wall of the screw cap along a circumferential direction. When needing to pass through the mounting hole, the plurality of Z-shaped gaskets may be folded through the elastic hinges to the top end of the screw cap and form elastic potential energy for rebounding. The contact surfaces of the Z-shaped gaskets and the screw cap are curved surfaces I having the same curvature radius as the outer surface of the screw cap. The contact surfaces of the Z-shaped gaskets and the mounting hole of the plate are curved surfaces II having the same curvature radius as the inner surface of the mounting hole. The spot welding strength between the elastic hinges and the Z-shaped gaskets should ensure that the Z-shaped gaskets are pressed against the plate under the pre-tension action of the bolt after being reset, and after that, the Z-shaped gaskets and the elastic hinges are automatically separated.

The elastic hinges have a maximum open angle of 180 degrees and is capable of rebounding a section of force in two directions.

If two Z-shaped gaskets are provided, the fixed plate is rectangular; or if three Z-shaped gaskets are provided, the fixed plate is triangular; or if four Z-shaped gaskets are provided, the fixed plate is square.

The fixed plate is 2 mm in thickness.

The spot welding strength between the screw cap and the fixed plate should ensure that: the Z-shaped gaskets are pressed against the plate under the pre-tension action of the bolt after being reset, and after that, the fixed plate and the screw cap are automatically separated.

Advantageous Effect

The present invention has the beneficial effects that: the present invention realizes the single side fastening only by installing the bolt on one side; the plurality of Z-shaped gaskets in the present invention lock the inner wall of the mounting hole and the screw cap after being installed, so as to play a fastening role and achieve a good fastening effect; the cylindrical screw cap in the present invention is convenient to manufacture, so that a relatively small hole is perforated in the plate, and the mechanical properties of the screw cap are less reduced; the Z-shaped gaskets in the present invention expand on their own with the utilization of elastic resilience instead of an auxiliary installation tool, so the operation is simple; and the present invention meets steel structure design requirements and may be well applied to connection of a steel structure, in particular to a concrete-filled steel tube structure.

Compared with the prior art, the Z-shaped gaskets of the present invention are simple in structure, suitable for factory production and higher in integrality and may bear a relatively high force, so that the mechanical properties are strengthened. According to the blind bolt fastener of the present invention, a relatively small hole is perforated in a connected plate to less weaken the plate. During field installation, the Z-shaped gaskets are rebounded by utilizing the self-resetting effect of the elastic hinges, so that the operation is simpler and more convenient. The blind bolt fastening device may be widely applied to the fields of civil and architectural engineering, mechanical engineering and the like.

BRIEF DESCRIPTION OF THE DRAWINGS

The present invention is further described below with reference to accompanying drawings and embodiments.

Figure 1:
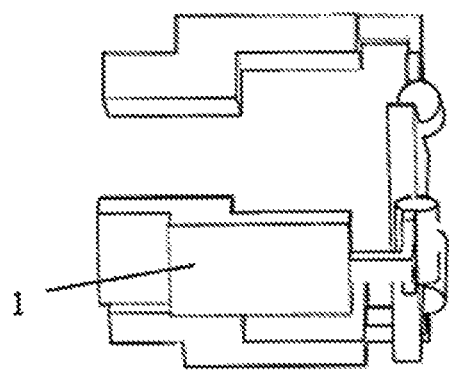
FIG. 1 is a three-dimensional schematic diagram of the present invention.

In the drawings: 1: Z-shaped gasket; 2: fixed plate; 3: elastic hinge; 4: screw cap; 5: lock nut; 6: integrated gasket; 7: plate; 7-1: mounting hole; and 8: screw.

DETAILED DESCRIPTION OF THE INVENTION

The present invention is further described below in combination with embodiments.

Figure 2:
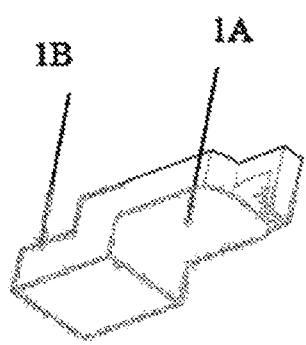
FIG. 2 is a three-dimensional schematic diagram of a Z-shaped gasket of the present invention.
Figure 3:
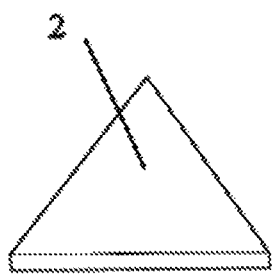
FIG. 3 is a three-dimensional schematic diagram of a fixed plate of the present invention.
Figure 4:
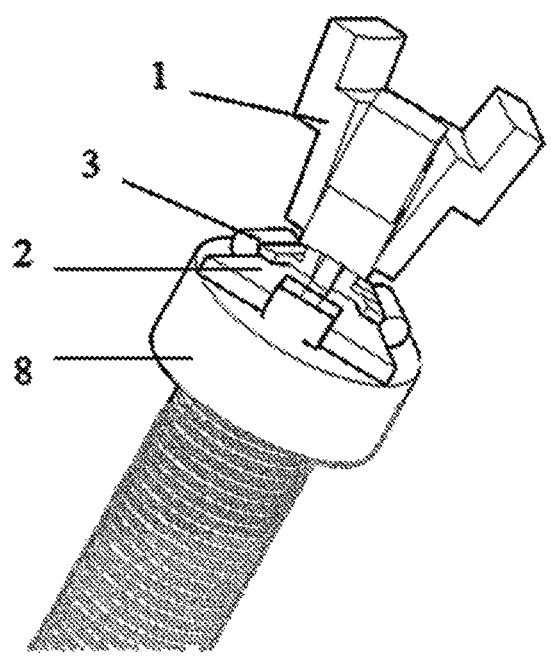
FIG. 4 is a schematic diagram of rotation positions of gaskets of the present invention before installation.
Figure 5:
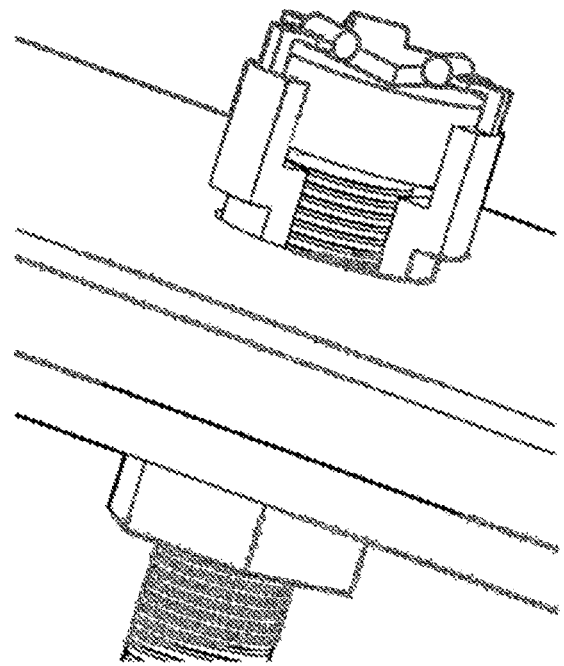
FIG. 5 is a three-dimensional schematic diagram of a whole blind bolt device of the present invention after Z-shaped gaskets are reset.
Figure 6:
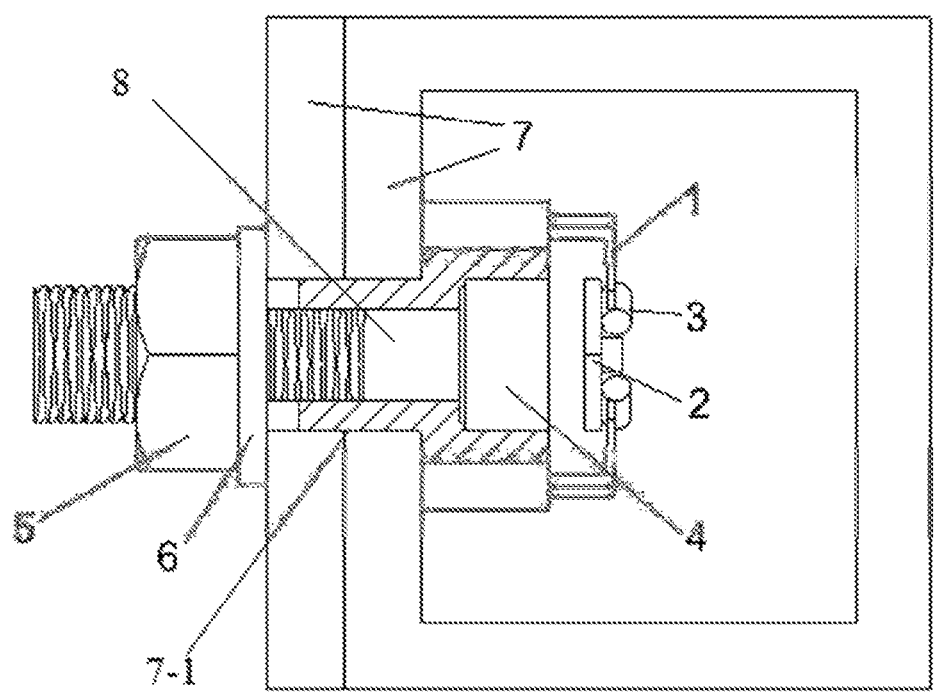
FIG. 6 is a schematic diagram of a use state of the present invention.

A blind bolt fastening device, as shown in FIGS. 1 to 6, includes a screw cap 4 and a screw 8. The screw cap 4 is circular. A mounting hole 7-1 capable of allowing the screw cap 4 to pass through is formed in a plate 7 to be connected. The top end of the screw cap 4 is connected to a fixed plate 2 in a spot welding manner. A plurality of elastic hinges 3 are uniformly mounted on the fixed plate 2. One end of each elastic hinge 3 is rotatably fixed on the fixed plate 2. Connection points between the elastic hinges 3 and the fixed plate 2 do not exceed the outer edge of the fixed plate 2. The other end of each elastic hinge 3 is connected to a Z-shaped gasket 1 in a spot welding manner. In an initial state, the plurality of Z-shaped gaskets 1 are uniformly distributed and fitted onto the outer wall of the screw cap 4 along a circumferential direction. When needing to pass through the mounting hole 7-1, the plurality of Z-shaped gaskets 1 may be folded through the elastic hinges 3 to the top end of the screw cap 4 and form elastic potential energy for rebounding. The contact surfaces of the Z-shaped gaskets 1 and the screw cap 4 are curved surfaces I 1A having the same curvature radius as the outer surface of the screw cap 4. The contact surfaces of the Z-shaped gaskets 1 and the mounting hole 7-1 of the plate 7 are curved surfaces II 1B having the same curvature radius as that of the inner surface of the mounting hole 7-1. The spot welding strength between the elastic hinges 3 and the Z-shaped gaskets 1 should ensure that the Z-shaped gaskets 1 are pressed against the plate 7 under the pre-tension action of the bolt after being reset, and the Z-shaped gaskets 1 and the elastic hinges 3 are automatically separated after the Z-shaped gaskets 1 are pressed.

The bolt may be a 10.9-level pressure bearing type high-strength bolt. The Z-shaped gaskets 1 are made of 20MnTiB (M is less than or equal to 24) or 35 VB (M is less than or equal to 30). The fixed plate is made of Q235 steel.

The elastic hinges 3 have a maximum open angle of 180 degrees and are capable of rebounding a section of force in two directions.

If two Z-shaped gaskets 1 are provided, the fixed plate 2 is rectangular; or if three Z-shaped gaskets 1 are provided, the fixed plate 2 is triangular; or if four Z-shaped gaskets 1 are provided, the fixed plate 2 is square.

The fixed plate 2 is 2 mm in thickness.

The spot welding strength between the screw cap 4 and the fixed plate 2 should ensure that: the Z-shaped gaskets 1 are pressed against the plate 7 under the pre-tension action of the bolt after being reset, and the fixed plate 2 and the screw cap 4 are automatically separated after the Z-shaped gaskets 1 are pressed.

The installation mode of the present invention is as follows: the Z-shaped gaskets 1 rotate around the elastic hinges 3 to the top of the screw cap 4 to smoothly pass through the mounting hole 7-1 of the plate; the Z-shaped gaskets 1 rebound to an initial position under the resilience action of the elastic hinges 3 after passing through the mounting hole 7-1 of the plate; the screw is outwards pulled along an axial direction, and then the fixed plate is separated from the screw cap 4 immediately to allow the Z-shaped gaskets 1 to be in close contact with the screw cap 4, and a hexagonal nut is tightened; after the nut is tightened, the Z-shaped gaskets 1 transmit part of a pretightening force of the bolt to the side surface of the screw cap and the inner surface of the mounting hole 7-1 to form a similar lever effect, which may tightly fix the screw cap, the Z-shaped gaskets and the plate.

The above solution is only the optimal implementation solution of the present invention, but any improvements that are made without departing from the spirit background of the present invention shall all fall within the protection scope of the present invention.

What is claimed is:

1. A blind bolt fastening device comprising:
   a fixed plate having a mounting hole;
   a screw cap
   a screw, wherein the mounting hole is capable of allowing the screw cap to pass through the mounting hole of the fixed plate; a top end of the screw cap is connected to the fixed plate in a spot welding manner;
   a plurality of elastic hinges are uniformly mounted on the fixed plate; one end of each elastic hinge of said plurality of elastic hinges is rotatably fixed on the fixed plate; wherein connection points between the plurality of elastic hinges and the fixed plate do not exceed an outer edge of the fixed plate;
   a plurality of Z-shaped gaskets, wherein the other end of each elastic hinge of said plurality of elastic hinges is connected to the plurality of Z-shaped gaskets in a spot welding manner; in an initial state, the plurality of Z-shaped gaskets are uniformly distributed and fitted onto an outer wall of the screw cap along a circumferential direction; when needing to pass through the mounting hole, the plurality of Z-shaped gaskets may be folded through the plurality of elastic hinges to the top end of the screw cap and form elastic potential energy for rebounding;
   contact surfaces of the plurality of Z-shaped gaskets and the screw cap are curved surfaces having the same curvature radius as outer surface of the screw cap; contact surfaces of the plurality of Z-shaped gaskets and the mounting hole of the fixed plate are curved surfaces having the same curvature radius as inner surface of the mounting hole; and the spot welding strength between the plurality of elastic hinges and the plurality of Z-shaped gaskets ensures that the plurality of Z-shaped gaskets are pressed against the fixed plate under the pre-tension action of the bolt after being reset, and after that, the plurality of Z-shaped gaskets and the plurality of elastic hinges are automatically separated.

2. The blind bolt fastening device according to claim 1, wherein the plurality of elastic hinges have a maximum open angle of 180 degrees and are capable of rebounding a section of force in two directions.

3. The blind bolt fastening device according to claim 1, wherein said plurality of Z shaped gaskets comprises two Z-shaped gaskets, wherein the fixed plate is rectangular.

4. The blind bolt fastening device according to claim 1, wherein the fixed plate is 2 mm in thickness.

5. The blind bolt fastening device according to claim 1, wherein the spot welding strength between the screw cap and the fixed plate ensures that the plurality of Z-shaped gaskets are pressed against the fixed plate under the pre-tension action of the bolt after being reset, and after that, the fixed plate and the screw cap are automatically separated.

6. The blind bolt fastening device according to claim 1, wherein the plurality of Z-shaped gaskets are made of 20MnTiB (M is less than or equal to 24) or 35 VB (M is less than or equal to 30), and the fixed plate is made of Q235 steel.

7. The blind bolt fastening system as in claim 1, wherein said plurality of Z shaped gaskets comprises three Z-shaped gaskets and wherein the fixed plate is triangular.

8. The blind bolt fastening system as in claim 1, wherein said plurality of Z shaped gaskets comprises four Z-shaped gaskets and wherein the fixed plate is triangular.

* * * * *